United States Patent [19]

Bujalski et al.

[11] Patent Number: 5,958,324
[45] Date of Patent: Sep. 28, 1999

[54] METHOD FOR FORMATION OF CRYSTALLINE BORON-DOPED SILICON CARBIDE AND AMORPHOUS BORON SILICON OXYCARBIDE FIBERS FROM POLYMER BLENDS CONTAINING SILOXANE AND BORON

[75] Inventors: Duane Ray Bujalski, Auburn; Kai Su, Midland, both of Mich.

[73] Assignee: Dow Corning Corporation, Midland, Mich.

[21] Appl. No.: 09/019,577

[22] Filed: Feb. 6, 1998

[51] Int. Cl.$^6$ .......................... C04B 35/56; C04B 35/571
[52] U.S. Cl. .......................... 264/470; 264/473; 264/477; 264/625; 264/627; 264/DIG. 19
[58] Field of Search ...................... 264/625, 627, 264/DIG. 19, 640, 470, 473, 477

[56] References Cited

U.S. PATENT DOCUMENTS

| | | | |
|---|---|---|---|
| 4,100,233 | 7/1978 | Yajima et al. | 264/625 |
| 4,248,814 | 2/1981 | Yajima et al. | 264/625 |
| 4,581,468 | 4/1986 | Paciorek et al. | 556/403 |
| 4,832,895 | 5/1989 | Johnson | 264/29.1 |
| 4,931,100 | 6/1990 | Johnson | 106/163.1 |
| 5,167,881 | 12/1992 | Atwell et al. | 264/22 |
| 5,279,780 | 1/1994 | Lipowitz et al. | 264/82 |
| 5,366,943 | 11/1994 | Lipowitz et al. | 501/95 |
| 5,545,687 | 8/1996 | Burns et al. | 364/625 |
| 5,705,122 | 1/1998 | Curran et al. | 264/625 |

FOREIGN PATENT DOCUMENTS

| | | | |
|---|---|---|---|
| 57-56567 | 11/1982 | Japan . | |
| WO/9116479 | 10/1991 | WIPO | 264/627 |

OTHER PUBLICATIONS

High Temperature Siloxane Elastomers, Chapter V, "Carborane–Siloxane Polymers" by P. R.Dvornic and R. W. Lenz.
"Decaborane Based Polymers", by S. Packirisamy, Prog. Polym. Sci., vol. 21, pp. 707–773, 1996.
"Synthesis and Characterization of Poly(carborane–siloxane–acetylene)", by Henderson and Keller, Maraomolecules, vol. 24, pp. 1660–1661, 1994.

*Primary Examiner*—James Derrington
*Attorney, Agent, or Firm*—Catherine U. Brown; Sharon K. Severance; Timothy J. Troy

[57] ABSTRACT

The present invention relates to a method for the formation of amorphous boron silicon oxycarbide fibers and crystalline boron-doped silicon carbide fibers comprising: preparing a blend of a siloxane resin and a boron-containing polymer, forming the blend into green fibers, and then curing and pyrolyzing the fibers.

18 Claims, No Drawings

METHOD FOR FORMATION OF CRYSTALLINE BORON-DOPED SILICON CARBIDE AND AMORPHOUS BORON SILICON OXYCARBIDE FIBERS FROM POLYMER BLENDS CONTAINING SILOXANE AND BORON

FIELD OF THE INVENTION

This invention relates to the preparation of crystalline boron-doped silicon carbide (SiCB) fibers and amorphous boron silicon oxycarbide (SiOCB) fibers from blends of siloxane resins and boron containing polymers.

BACKGROUND OF THE INVENTION

Silicon-based ceramic fibers are used as reinforcement materials in composite applications, such as metal matrix composites and ceramic matrix composites (CMC's). At high temperatures, crystalline silicon carbide (SiC) fibers have superior thermal stability and chemical resistance over silicon oxycarbide fibers, such as Nicalon™ and Tyranno™ fibers. Silicon oxycarbide fibers tend to lose oxygen at temperatures above 1,200° C., and the crystallization of SiC results in formation of a porous structure. As a result, the fiber loses nearly all of its mechanical strength.

Several processes have been used to manufacture high strength silicon carbide (SiC) fibers. U.S. Pat. Nos. 5,279,780 and 5,366,943 to Lipowitz et al. describe the formation of crystalline SiC fibers by doping commercial Nicalon™ and Tyranno™ fibers with boron containing species followed by densification at higher temperature. These commercially available fibers are prepared from expensive polycarbosilane precursors. Use of polycarbosilanes presents several problems in production of boron silicon oxycarbide fibers. For example, the polymers are slow to cross-link and the green fibers produced are fragile. These problems make continuous processing difficult. Also, low yields and complicated processes cause the fibers to be expensive.

Japanese patent application JP-A-57-56567 by Yajima et al. discloses a heat resistant inorganic fiber and method for its manufacture. The fiber typically has 27 to 40 mol % silicon carbide, 10 to 15 mol % $B_4C$, and 45 to 63 mol % free carbon. The fiber is prepared by dry spinning a polymer that contains mainly Si, B, and O into a fiber, curing the fiber by heating, and pyrolyzing the fiber by heating to high temperature. However JP-A-57-56567 does not disclose the use of a polymer blend for preparation of SiOCB or SiCB fibers.

The use of siloxane polymers as precursors to crystalline SiC fibers is described in U.S. Pat. No. 5,167,881 to Atwell et al. The siloxane polymers are phenyl-containing polyorganosiloxane resins with 3 to 6 weight percent silanol groups. Boron is incorporated into the siloxane polymers either prior to or during formation of the fibers, or during at least one of the infusibilizing or pyrolyzing steps of the process to produce substantially polycrystalline SiC fibers. The boron is incorporated by exposing the precursor or fiber to an atmosphere containing a gaseous boron-containing compound such as diborane or boron trichloride.

The use of polymer blends to produce boron-containing carbonaceous fibers is disclosed in U.S. Pat. Nos. 4,931,100 and 4,832,895 to Johnson. A precarbonaceous polymer, such as polyacrylonitrile, was blended with a borane polymer, such as that formed by the reaction of a borane compound with a Lewis base. Boron-containing carbon fibers were obtained by either dry or wet spinning of such blends, followed by oxidation cure and pyrolysis. However, these patents do not disclose the use of siloxane polymers in the blend.

One object of this invention is formation of amorphous SiOCB fibers from a blend of a siloxane resin and a boron containing polymer. A further object of this invention is to provide a high strength SiOCB ceramic fiber.

Another object of this invention is formation of crystalline SiCB fibers from a blend of a siloxane resin and a boron containing polymer. A further object of this invention is to provide a high strength SiCB ceramic fiber.

SUMMARY OF THE INVENTION

This invention relates to a method for formation of amorphous boron silicon oxycarbide (SiOCB) fibers and crystalline boron-doped silicon carbide (SiCB) fibers from a blend of a siloxane resin and a boron containing polymer. The blend is thermally and hydrolytically stable and can be melt spun into continuous green fibers. The green fibers are cured and pyrolyzed to give SiOCB or SiCB ceramic fibers.

DETAILED DESCRIPTION OF THE INVENTION

The present invention pertains to a method for preparing a ceramic material, preferably a ceramic fiber, comprising pyrolyzing a blend comprising a siloxane resin and a boron containing polymer at a temperature sufficient to produce the ceramic material.

The amount of siloxane resin in the blend is typically 90 to 99.9, preferably 96 to 99.0 weight percent. The siloxane resin has excellent thermal stability at melt spin temperatures and can be spun into small diameter green fibers with a non-sticky surface.

The siloxane resin contains units of the formula $R_x R^1_y R^2_z SiO_{(4-x-y-z)/2}$ wherein each R is independently selected from unsaturated monovalent hydrocarbon groups, each $R^1$ is independently selected from aryl groups of 6 to about 10 carbon atoms, and each $R^2$ is independently selected from saturated monovalent hydrocarbon groups, x has a value of 1 or 2, y has a value of 0, 1, or 2, and z has a value of 0, 1, or 2 with the proviso that x+y+z=1, 2, or 3.

In the above formulae, R is preferably an alkenyl group such as vinyl, allyl, propenyl, pentenyl, or hexenyl, with vinyl being most preferred. $R^1$ is preferably a phenyl, tolyl, or xylyl group, with phenyl being most preferred. $R^2$ is preferably an alkyl group such as methyl, ethyl, n-propyl, or isopropyl, with methyl being most preferred.

Preferred siloxane resins have the formula $(R^1SiO_{3/2})_e (R^2SiO_{3/2})_f (RR^2_2SiO_{1/2})_g$, where R, $R^1$, and $R^2$, are as defined above and $0 \leq e \leq 0.98$, $0 \leq f \leq 0.98$, $0 < g \leq 1$, and e+f+g=1. Preferably, e has a value of 0.2 to 0.5, f has a value of 0.2 to 0.5, and g has a value of 0.15 to 0.3. More preferably, R represents a vinyl group, $R^1$ represents a phenyl group, $R^2$ represents a methyl group, and e, f, and g are as defined above.

The siloxane resins are well known in the art and their method of preparation is not critical. One method includes acid catalyzed hydrolysis of alkoxysilanes followed by base catalyzed condensation. The siloxane resins produced by methods known in the art typically have a glass transition temperature (Tg) below 40° C. These siloxane resins also typically have a broad molecular weight distribution (Mw/Mn), for example, Mw/Mn>3 (where Mw represents weight average molecular weight and Mn represents number average molecular weight). The resins are preferably fractionated to produce a siloxane resin with Tg preferably in the range of 100 to 150° C.

The resin may be fractionated by any method known in the art such as precipitation, extraction, vacuum distillation, sublimation, and combinations thereof. The fractionation process typically results in the removal of low molecular weight oligomers from the siloxane resin. Preferably, solvent precipitation or supercritical fluid extraction is used. Solvent precipitation includes dissolving the resin in a solvent such as toluene, and then adding the solution to a nonsolvent such as methanol to precipitate the resin. The precipitate (the fractionated resin) is then collected and dried. The fractionated resins are particularly suited to melt spinning.

The boron containing polymer is selected such that it can be blended with the siloxane resin. The boron containing polymer is added in an amount of 0.1 to 10, preferably 1 to 5 weight percent of the blend. Useful boron containing polymers include, but are not limited to: polymers derived from carboranes, such as carborane-siloxane polymers and poly(carborane-siloxane-acetylene) polymers and borazine-based polymers.

The boron containing polymer may be a polymer derived from carboranes. For example, carborane-siloxane polymers are suitable for this invention. Carborane-siloxane polymers and methods for their preparation are known in the art. For example, suitable carborane-siloxane polymers are described in *High Temperature Siloxane Elastomers*, Chapter V. "Carborane-Siloxane Polymers" by P. R. Dvornic and R. W. Lenz and "Decaborane Based Polymers" by S. Packirisamy, in *Prog. Polym. Sci.* Vol. 21, pp. 707–773 (1996). These carborane-siloxane polymers are prepared by condensation polymerization of carborane derivatives with alkylchlorosilanes or alkylchlorosiloxanes in the presence of a catalyst. Preferably, the carborane derivatives are bis (dimethylsily)-m-carborane with bis(chlorosilyl)-m-carborane derivatives.

Suitable carborane-siloxane polymers typically comprise dialkylsiloxane or diarylsiloxane units linked by m-carborane cage structures. These carborane-siloxane polymers include polymers with the general formula:

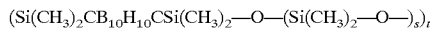

where s represents an integer with a value of 0 to 20 and t represents 2 to 1,000. Preferably s is 0 to 3 and t is 2 to 50.

Carborane-siloxane polymers are typically present in the blend at an amount of 0.1 to 10 weight percent of the blend, preferably 1 to 5 weight percent, and more preferably 1 to 4.0 weight percent of the blend. These polymers are commercially available under the trade-name Dexsil™, produced by Olin Corporation. Dexsil™ 200, Dexsil™ 202, Dexsil™ 300, Dexsil™ 400, and Dexsil™ 500 are examples of preferred carborane-siloxane polymers. Dexsil™ 300 is particularly preferred.

Another suitable type of polymer derived from carboranes includes poly(carborane-siloxane-acetylene) polymers. Examples of suitable poly(carborane-siloxane-acetylene) polymers and methods for their preparation are disclosed in "Synthesis and Characterization of Poly(carborane-siloxane-acetylene)" by Henderson and Keller, *Macromolecules*, Volume 24, pp. 1660–1661, (1994). These poly(carborane-siloxane-acetylene) polymers can be synthesized by reacting a lithium compound with a diene compound, to form a di-lithiated-diyne compound. Typically, at least 4 equivalents of the lithium compound per mole of the diene compound are used. The di-lithiated-diyne is further reacted with a carborane-siloxane polymer to form a poly(carborane-siloxane-acetylene) polymer. Typically, equimolar amounts of di-lithiated-diyne and carborane-siloxane polymer are used. Typically, both reactions run in situ at low temperatures, for example, from less than ambient to −78° C. Examples of suitable poly(carborane-siloxane-acetylene) polymers have the formula:

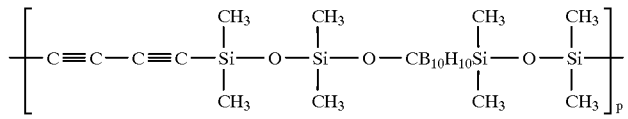

where p is 2 to 1,000.

The boron containing polymer may also be a borazine-based polymer, such as those described in U.S. Pat. No. 4,581,468 to Paciorek et al., hereby incorporated by reference. Suitable borazine-based polymers can be synthesized by condensation reaction of a borazine compound, such as B-trichloro-N-tris(trialkylsilyl)borazine, with ammonia. This reaction typically runs at −78 to 25° C., within 4 to 24 hours, under an inert atmosphere, preferably nitrogen, helium, or argon. Typically, 2 to 10 times the stoichiometric amount of ammonia is used. Examples of suitable borazine-based polymers have the following structures:

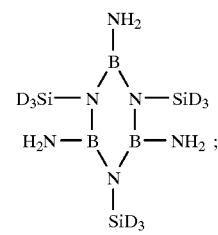

-continued

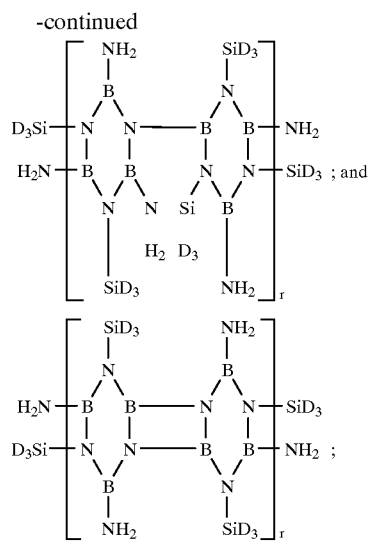

where D represents an alkyl group, such as methyl, ethyl, propyl, and butyl; and r represents 1, 2, 3, or 4. When ingredient b) is a borazine-based polymer, it is added in an amount of 1 to 5 weight percent of the blend.

The blend of the siloxane resin and the boron containing polymer may be prepared by first dissolving the siloxane resin and the boron containing polymer in a solvent. Suitable solvents are exemplified by alkanes, such as pentane, hexane, and heptane; ethers, such as diethyl ether, methylphenyl ether, and tetrahydrofuran; and aromatic hydrocarbons such as toluene and xylene. Pentane is preferred. The solvent is then evaporated, for example, under vacuum or by heating. The blend may then be dried by heating at 150 to 200° C. under vacuum for 1 to 4 hours. Preferably the blend is dried by heating at a temperature 150 to 180° C. for at least 1 hour.

The blend may then be pyrolyzed to a ceramic material by heating to high temperature under an inert atmosphere such as vacuum; or argon, helium, or nitrogen. Preferably the inert atmosphere comprises argon. Inert means containing less than 500 ppm oxygen. The blend is heated to a temperature of 800 to 2,200° C. to yield a ceramic material.

The ceramic material formed will be boron silicon oxycarbide when the blend is pyrolyzed by heating to a temperature of 800 to 1,400° C. Boron-doped silicon carbide can be formed by further heating the boron silicon oxycarbide to a temperature of 1,500 to 2,200° C. Alternatively, boron-doped silicon carbide can be formed from the blend directly by heating the blend to 1,500 to 2,200° C.

In an alternative embodiment of the invention, the blend may be formed into any desired shape, preferably fibers, before curing and pyrolyzing. The blend may be spun into a green fiber by conventional spinning techniques such as melt spinning, wet spinning, or dry spinning. Preferably, the blend is melt spun by extruding the blend through an orifice such as a spinneret, and the resulting green fiber is taken up continuously on a spool. The fiber diameter is 10 to 40 micrometers and preferably 13 to about 25 micrometers. The melt spinning is typically carried out at a temperature of 100 to 250° C., preferably 200 to 240° C., depending on the glass transition temperature of the siloxane resin.

The green fibers are then cured to render them non-fusible and to prevent them from deforming when pyrolyzed. Non-fusible fibers will not stick together when heated to the pyrolysis temperature. Non-fusibility is tested by determining the solubility of the cured fiber in toluene. A non-fusible fiber is essentially insoluble in toluene or has only a limited solubility in toluene. The green fibers can be cured, for example, by exposing them to oxidizing gases such as $O_3$ and NO, or by exposing them to high energy radiation sources such as gamma rays, x-rays, and electron beam radiation. The fibers are preferably cured by exposure to high energy radiation, preferably electron beam radiation.

Units for producing electron beams are known in the art and are commercially available. Generally, such units comprise a cathode (such as a tungsten filament) and an anode. Both heated and cold cathode sources are within the scope of the present invention. The cathode produces electrons at a very high rate. Applying a large voltage to the anode accelerates and concentrates the electrons, under vacuum, forming a high energy beam. The green fiber is heated by absorbing the kinetic energy of the bombarding electrons of the high energy beam. Typically, the accelerating voltage is in the range of about 100 to 300 keV, the vacuum is in the range of about 0.001 to 10 Pa, the electron currents range from about 0.1 milliampere to 30 amperes, and the power in the beam varies from about 0.1 watt to 90 kilowatts. The dose received by the fibers is in the range of 10 to 200 Mrad, preferably 60 to 120 Mrad.

The green fibers are exposed to the radiation for a time effective to provide a dose required to cure the fibers. The time required depends on the current density of the electron beam radiation, however, the time is typically 0.01 to 10 seconds. The fibers are exposed to the radiation under an inert atmosphere such as helium, nitrogen, or argon.

The green fibers may be cured continuously while spinning, batch cured after spinning, or any combination thereof. Continuous curing means that the fibers are exposed to the cure mechanism as they are formed and before they are collected on a spool. Batch curing occurs by collecting the green fibers on a spool and subsequently exposing them to the cure mechanism.

The cured fibers may then be pyrolyzed to amorphous SiOCB fibers or crystalline SiCB fibers by heating to a temperature of 800 to 2,200° C. By "amorphous fiber", it is meant a primarily non-crystalline fiber including fibers that contain very small crystallites (nano- or micro-crystals) in a non-crystalline continuous phase. Pyrolysis may be performed continuously, or the cured fiber can be collected and batch pyrolyzed. Methods for pyrolyzing polysiloxane fibers into ceramic fibers are well known in the art and can be used herein.

SiOCB fibers are obtained by heating the cured fibers under an inert atmosphere such as vacuum; or argon, helium, or nitrogen. Preferably the inert atmosphere comprises argon. The fibers are heated to a final temperature of 800 to 1,400° C., preferably 800 to 1,200° C. and then held at the final temperature for a time sufficient to form the SiOCB fibers, preferably up to 1 hour. The SiOCB fibers of the present invention are typically obtained in 75 to 85% ceramic yield. The boron content of the fibers ranges from about 0.01 to 5, preferably 0.2 to about 2%. The tensile strength of the fibers is typically 200 to 600 ksi, preferably 270 to 600 ksi. The SiOCB fibers have an amorphous structure, as identified by X-ray diffraction.

The SiOCB fibers can be further pyrolyzed to form crystalline SiCB fibers by heating under an inert atmosphere such as vacuum; or argon, helium, or nitrogen. Preferably the inert atmosphere comprises argon. The SiOCB fibers are preferably further heated to a final temperature of 1,500 to 2,200, preferably 1,500 to 1,900° C. to remove oxygen. The fibers are held at the final temperature for 1 minute to 5 hours, preferably 30 minutes to 5 hours. The SiCB fibers produced typically have a diameter of 5 to 30 micrometers, preferably 7 to 20 micrometers. The structure may be dense and homogenous or a matrix of microfibers with diameters of about 0.1 micrometer.

The cured fibers can also be pyrolyzed directly to crystalline SiCB fibers by heating under the inert atmosphere, preferably argon. The fibers are heated to a temperature of 1,600 to 2,200° C., preferably 1,800 to 1,900° C. The fibers are held at the temperature for 1 minute to 5 hours, preferably 10 minutes to 5 hours.

EXAMPLES

These examples are intended to illustrate the invention to those skilled in the art and should not be interpreted as limiting the scope of the invention set forth in the claims. In the examples, Ph represents a phenyl group, Vi represents a vinyl group, and Me represents a methyl group.

Resin Preparation

Phenyltrimethoxysilane, methyltrimethoxysilane, and 1,1,2,2-tetramethyl-1,2-divinyl siloxane were loaded into a reactor in a molar ratio of 2.78:3.17:1.00, respectively. A 20 weight percent solution of trifluoromethanesulfonic acid in de-ionized water was added to the reactor, and the solution immediately turned yellow. The mixture was heated to reflux for 90 minutes, and then toluene and water were added. The mixture was heated to reflux for an additional 90 minutes. Calcium carbonate was then added and the solvent distilled until the overhead temperature increased to 84° C. Additional toluene was then added to adjust the solid content to 47%. Aqueous 3 wt % potassium hydroxide was added and the water azeotropically removed. After the mixture was dry of water (5 hours), the reflux continued for 13 hours before cooling to 50–60° C. Chlorodimethylvinylsilane was added and the solution was stirred at room temperature overnight. The solution was first filtered, followed by further distillation through a 0.45 micrometer membrane. A sample of the solution was vacuum dried. Nuclear Magnetic Resonance (NMR) analysis of the polymer indicated that it had the formula:

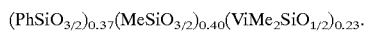

$(PhSiO_{3/2})_{0.37}(MeSiO_{3/2})_{0.40}(ViMe_2SiO_{1/2})_{0.23}$.

The polymer solution was fractionated by diluting with toluene and adding the resulting solution to methanol at a solution:methanol volume ratio of 1:8. This yielded white precipitate, which was collected and dried at 160° C. for 1 hour in vacuo.

Example 1

Four samples of the fractionated siloxane resin and Dexsil™ 300 polymer were dissolved in pentane. The pentane was vacuum evaporated and the resulting polymer blends dried in vacuo at 180° C. for 1 hour. The blend compositions and glass transition temperatures are presented in Table 1.

Example 2

Samples of the siloxane resin alone, Dexsil™ 300 alone, and each of the blends prepared in Example 1 were charged in an Astro™ furnace and heated at 10° C. per minute to either 1,200° C. or 1,800° C. under argon. The char yields are given in Table 2.

X-ray diffraction analyses indicated an amorphous structure for all the 1,200° C. materials obtained from the siloxane polymer and the blends. X-ray diffraction analyses showed a mixture of β-SiC and $B_4C$ for the 1,800° C. ceramic char and a mixture of β-SiC, $B_2O_3$, and $B_4C$ for the 1,200° C. from the Dexsil™ 300 polymer. Greater than 99% β-SiC and small amounts of carbon were observed in the 1800° C. ceramic chars obtained from the siloxane polymer and the blends. No $B_4C$ was detected in those samples prepared from the blends.

Example 3

The polymer blends prepared in Example 1 were melt-spun into single filament fibers as follows. Typically, a 5.2 g sample of the polymer blend was ground into a fine powder with a mortar and pestle and pressed into a rod at 500 psi. The polymer rod was transferred into an extruder and heated to a spinning temperature of 200–240° C. The resulting fibers had diameters of about 13 to about 25 micrometers, and they were taken up continuously at 50 to 80 m/minute on a spool.

The green fiber tow collected on the spool was cut and laid on a piece of paper. The fibers were then spread out and fixed on a clip board and passed through the electron beam curing zone. The fibers were exposed to electron beam radiation of 20 to 120 Mrad to cure. The fibers were cured as indicated by their insolubility in toluene.

Example 4

The cured fibers produced in Example 3 were heated at 3° C./minute to 1,200° C. and held at 1,200° C. for 1 hour. The SiOCB fibers were obtained at about 75 to 80 percent ceramic yield and were separable. Mechanical testing indicated the fibers had tensile strength of about 270 ksi. The boron content of the fibers ranged from about 0.01 to 5 weight percent. X-ray diffraction analysis of the fibers indicated an amorphous structure. A scanning electron microscope (SEM) micrograph of the fibers showed a smooth surface and a glassy cross section.

Example 5

The cured fibers prepared in Example 3 were placed in an Astro carbon resistant furnace and heated at 3° C./min to 1,800° C. under argon. The fibers were held at 1,800° C. for 10 minutes before cooling to room temperature. A SEM micrograph of a SiCB fiber prepared from blend 2 showed that the fiber had smooth surfaces and dense microstructures.

Example 6

The cured fibers prepared in Example 3 were placed in an Astro™ carbon resistant furnace and heated to 1,900° C. as follows: 10° C./minute to 1,200° C. and 3° C./minute to 1,900° C. for 30 minutes. The resulting SiCB fibers were then cooled to room temperature.

The fibers prepared from the polymer blends had diameters of 7 to 20 micrometers. A SEM micrograph of the SiCB fibers from blend 2 showed a dense homogenous microstructure. The micrograph of the fiber from blend 4 showed microfibers embedded in a continuous matrix. An Auger analysis of the ceramic fiber derived from blend 2 had nearly stoichiometric SiC at ca. 20 nm. X-ray diffraction analysis of the fiber from blend 2 indicated >99% β-SiC with a small amount of carbon.

TABLE 1

| Blend | Siloxane Resin (g) | Dexsil ™ 300 (g) | % Dexsil ™ 300 | Tg (°C.) |
|---|---|---|---|---|
| 1 | 20* | 0.22 | 1.09 | 124 |
| 2 | 20* | 0.44 | 2.15 | 121 |
| 3 | 20* | 0.66 | 3.20 | 127 |
| 4 | 6.7** | 0.31 | 4.30 | 110 |

*Mw = 12,581; Mn = 6,984; softening point = 124° C.
**Mw = 12,097; Mn = 6,740; sofiening point = 119° C.

TABLE 2

| Sample | 1200° C. Char Yield % | 1800° C. Char Yield % |
|---|---|---|
| Siloxane | 78.9 | 42.5 |
| Blend 1 | 65.5 | 39.0 |
| Blend 2 | 74.4 | 39.0 |
| Blend 3 | 70.0 | 39.0 |
| Blend 4 | 67.4 | 39.0 |
| Dexsil ™ 300 | 62.5 | 39.0 |

We claim:
1. A method for preparing ceramic fibers comprising:
   i) preparing a blend comprising:
      a) 90 to 99.9 weight percent of a siloxane resin comprising units with a general formula $R_xR^1_yR^2_zSiO_{(4-x-y-z)/2}$, wherein each R is independently selected from unsaturated monovalent hydrocarbon groups, each $R^1$ is independently selected from aryl groups of 6 to about 10 carbon atoms, and each $R^2$ is independently selected from saturated monovalent hydrocarbon groups, x has a value of 1 or 2, y has a value of 0, 1, or 2, and z has a value of 0, 1, or 2 with the proviso that x+y+z=1, 2, or 3, and
      b) 0.1 to 10 weight percent of a boron containing polymer;
   ii) shaping the blend into green fibers;
   iii) curing the green fibers to cured fibers; and
   iv) pyrolyzing the cured fibers to ceramic fibers by heating to a temperature of 800 to 2,200° C.
2. The method of claim 1, wherein the siloxane resin has the formula

$$(R^1SiO_{3/2})_e(R^2SiO_{3/2})_f(RR^2_2SiO_{1/2})_g,$$

where $0 \leq e \leq 0.98$, $0 \leq f \leq 0.98$, $0 < g \leq 1$, and e+f+g=1.

3. The method of claim 2, wherein R represents a vinyl group, $R^1$ represents a phenyl group, $R^2$ represents a methyl group, e has a value of 0.3 to 0.5, f has a value of 0.3 to 0.5, and g has a value of 0.15 to 0.3.

4. The method of claim 1, wherein the boron containing polymer is present at 1 to 5 weight percent of the blend.

5. The method of claim 1, wherein the boron containing polymer is selected from the group consisting of polymers derived from carboranes and borazine-based polymers.

6. The method of claim 5, wherein the boron containing polymer derived from carboranes is a carborane-siloxane polymer with a general formula $$(Si(CH_3)_2CB_{10}H_{10}CSi(CH_3)_2-O-(Si(CH_3)_2-O-)_s)_t$$

where s represents an integer with a value of 0 to 20 and t represents 2 to 1,000.

7. The method of claim 6, wherein s represents an integer with a value of 0 to 3 and t represents 2 to 50.

8. The method of claim 7, wherein the boron containing polymer is present at 1 to 4 weight percent of the blend.

9. The method of claim 5, wherein the boron containing polymer derived from carboranes is a poly(carborane-siloxane-acetylene) polymer.

10. The method of claim 1, wherein green fibers are produced by melt-spinning.

11. The method of claim 10, wherein the melt-spinning takes place at 200 to 240° C.

12. The method of claim 1, wherein curing the green fibers occurs by exposing them to high energy radiation.

13. The method of claim 12, wherein curing the green fibers occurs by exposing them to electron beam radiation.

14. The method of claim 1, wherein the ceramic fibers are boron silicon oxycarbide fibers and the pyrolyzing is carried out at a temperature of 800 to 1,400° C.

15. The method of claim 14, wherein the boron silicon oxycarbide fibers are further pyrolyzed to boron-doped silicon carbide fibers by heating to a temperature of 1,500 to 2,200° C.

16. The method of claim 1, wherein the ceramic fibers are boron-doped silicon carbide fibers, and the pyrolyzing is carried out at a temperature of 1,600 to 2,200° C.

17. The method of claim 1, wherein ingredient b) is a poly(carborane-siloxane-acetylene) polymer of formula:

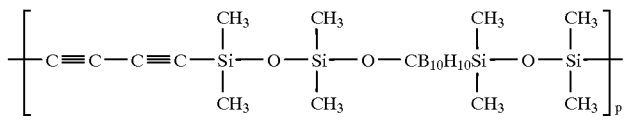

where p is 2 to 1,000.

18. The method of claim 1, wherein ingredient b) is a borazine-based polymer selected from the group consisting of:

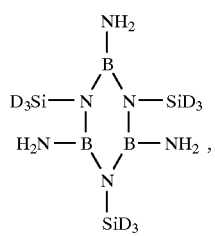
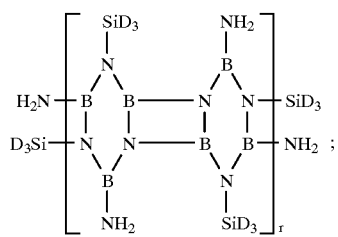
where D represents an alkyl group, and r represents 1, 2, 3, or 4; and ingredient b) is added in an amount of 1 to 5 weight percent of the blend.
* * * * *